United States Patent Office 2,956,045
Patented Oct. 11, 1960

2,956,045

SILALKYLTIN SILOXANES

Robert L. Merker, Pittsburgh, Pa., assignor to Dow Corning Corporation, Midland, Mich., a corporation of Michigan No Drawing. Filed Aug. 28, 1958, Ser. No. 757,660

14 Claims. (Cl. 260—46.5)

The present invention relates to certain cyclic and linear silalkyltin disiloxanes and to certain copolymers thereof.

The cyclic compounds of this invention can best be described as cyclic disiloxanes of the formula

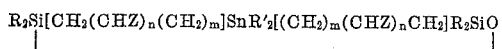

where each R is a monovalent hydrocarbon radical, each R' is selected from the group consisting of alkyl and phenyl radicals, Z is selected from the group consisting of hydrogen and the methyl radical, $m$ is an integer of from 0 to 1 inclusive, and $n$ is an integer of from 0 to 1 inclusive and is 1 only when $m$ is 1. The structure of these cyclics can be illustrated by the following formula, when is exemplary of the six-membered ring, the simplest of the cyclics in question:

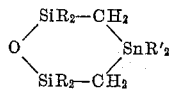

The linear disiloxanes of this invention include those of the formula $$O[SiR_2CH_2(CHZ)_n(CH_2)_mSnR'_3]_2$$

where R, R', Z, $m$ and $n$ are as above defined.

The copolymers of this invention include those consisting essentially of units derived from the above cyclics with units derived from the above linear disiloxanes, i.e. copolymers of units (1) of the formula

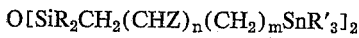

with units (2A) of the formula $$R'_3SnCH_2(CHZ)_n(CH_2)_mR_2SiO_{.5}$$

A second type of copolymer within the scope of this invention consists essentially of the (1) units above with (2B) units of the formula $$H_sR''_tSiO_{\frac{4-s-t}{2}}$$

where each R'' is a monovalent hydrocarbon or halogenated monovalent hydrocarbon radical, $t$ is an integer of from 1 to 3 inclusive, $s$ is from 0 to 1 inclusive and $s+t$ is from 1 to 3 inclusive. A third form of copolymer within the scope of this invention consists essentially of the above-described (2A) and (2B) units. The fourth type of copolymer is that which contains at least some of each of the (1), (2A) and (2B) units. As is usual with organosiloxanes, the copolymers of this invention may contain small amounts of silicon-bonded hydroxy groups.

The various polymers of this invention can be obtained by the hydrolysis of one or more monomeric compounds of the formula

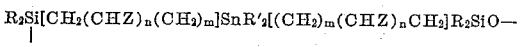

where RZ, R', $m$ and $n$ are as above defined, $x$ is 2 or 3, and Y is hydrogen or an alkoxy radical. When $x$ has a value of 2, the hydrolysis of the above monomer can produce the cyclic siloxanes described above. When $x$ has a value of 3, the linear compounds above can be obtained. The hydrolysis of these materials is best carried out by employing an aqueous alcohol solution as the hydrolysis medium and by conducting the hydrolysis in the presence of catalytic amounts of NaOH or KOH. When $m$ in the above compounds is 1, i.e. if the alkylene chain between the silicon and tin atoms is longer than 1 carbon atom, the best yields of cyclic materials can be obtained by thermally "cracking" the hydrolyzate in the presence of NaOH or KOH.

Since $n$ in the above definitions can be 1 only when $m$ is 1, it will be seen that the alkylene groups which can link the silicon atoms to the tin atoms will be either $$—CH_2—, —CH_2CH_2—, —(CH_2)_3—, \text{ or}$$
$$—CH_2CH(CH_3)CH_2—$$

groups.

The monomeric hydrolyzable silanes employed in the above-described hydrolysis can be prepared by the process set forth in greater detail in my copending application filed concurrently herewith entitled "Silalkyltin Compounds."

In brief, the aforesaid hydrolyzable silanes wherein Y is hydrogen can be prepared by reacting the corresponding Grignard reagent (i.e. $HR_2SiCH_2(CHZ)_n(CH_2)_mMgCl$ or the corresponding bromide or iodide) with the organotin halide $R'_xSnCl_{4-x}$ or $R'_xSnBr_{4-x}$. When $x$ is 2, products containing different $HR_2SiCH_2(CHZ)_n(CH_2)_m$ groups attached to the Sn atom can be prepared by employing a mixture of the different Grignard reagents within the above formula. The compounds in which Y is an alkoxy group can be prepared by reacting those in which Y is hydrogen with an anhydrous alcohol in the presence of a trace of sodium.

In the above-described Grignard reagent, each R can be any monovalent hydrocarbon radical and each can be the same or different from its fellow radicals. Examples of suitable R radicals include alkyl radicals such as methyl, ethyl, propyl and octadecyl; aryl radicals such as phenyl, xenyl, and naphthyl; alkaryl radicals such as tolyl and xylyl; aralkyl radicals such as benzyl; alkenyl and alkynyl radicals such as vinyl, allyl, propynyl, and cyclohexenyl; and cycloaliphatic radicals such as cyclohexyl. Preferably R is methyl, ethyl or phenyl.

In the organotin halide reactant described above, each R' radical is an alkyl or phenyl radical and the R' radicals on a particular Sn atom can be the same or different. Suitable alkyl radicals include methyl, ethyl, propyl, isopropyl, butyl, isobutyl and octyl radicals. The most preferred R' radicals are those alkyl radicals having from 1 to 4 inclusive carbon atoms in a straight chain.

The Grignard reagents referred to above are easily prepared in excellent yield by the conventional techniques for the preparation of Grignard reagents. Thus, a compound of the formula $HR_2SiCH_2(CHZ)_n(CH_2)_mCl$ or the corresponding bromide is ordinarily diluted with diethyl ether or tetrahydrofuran and intimately contacted with magnesium shavings. The necessary haloalkyldiorganosilane can be prepared by the reduction of the corresponding haloalkyldiorganohalosilane, e.g.

$$ClCH_2(CHZ)_n(CH_2)_mSiR_2Cl$$

with LiAlH₄. This reduction is carried out in essentially the same manner as that illustrated by Nebergall in J.A.C.S., 72, 4702, (1950). Generally, an equivalent amount of the LiAlH₄ is employed as a solution in ether or tetrahydrofuran and the reaction proceeds by merely contacting the two reactants. Where the haloalkyl group is a halomethyl group, the reaction is best conducted at about room temperature in order to avoid attack on that halogen. With increasing length of the alkylene chain, however, the reaction can be carried out at the reflux temperature of the solvent without undue attack upon the alkylene bonded halogen.

The necessary intermediates such as $$ClCH_2(CHZ)_n(CH_2)_mSiR_2Cl$$

are known compounds. They can be produced, for example, by halogenating $CH_3SiCl_3$ and then replacing two of the silicon-bonded halogen atoms by the conventional Grignard reaction with a $RMgCl$ compound, or, when longer alkylene chains are desired, by reacting allyl chloride, methallyl chloride, or vinyl chloride with a compound of the formula $R_2HSiCl$ in the presence of a catalyst such as chloroplatinic acid to produce the corresponding adduct. If desired the latter well-known addition reaction can be modified by employing $RHSiCl_2$ or $HSiCl_3$ in place of the $R_2HSiCl$, in which case the necessary additional R radical or radicals can then be attached by Grignardizing all but one of the silicon-bonded chlorine atoms.

The copolymers of this invention can be prepared by two major processes. In the first type of process, a homopolymer (including linear, cyclic, and organic solvent-soluble cross-linked forms of homopolymers) of the (2B) type is merely mixed with one or more polymers of the (1) type or (2A) type, or with both (1) and (2A) types, and the mixture is then subjected to conventional organosiloxane copolymerization conditions, for example heating the mixture in the temperature range of from 140° to 160° C. in the presence of NaOH or KOH as a catalyst. Such a catalyst is ordinarily employed in an amount sufficient to provide 1 K or Na atom for every 500 to 5,000 Si atoms in the mixture. Acid catalysts may also be used in this well-known "equilibration" type of reaction. The same technique can be applied to the formation of a copolymer containing only (1) and (2A) units.

In an alternative process for preparing the copolymers in question, the monomers corresponding to the siloxane units desired in a particular copolymer are merely cohydrolyzed. The entire cohydrolyzate is then preferably subjected to an equilibration, as for example by the NaOH or KOH catalyzed reaction at 140° to 160° C. as discussed above. In this alternative process there is then no need for isolation of separate polymeric species prior to their being mixed and copolymerized. Inert solvents can be present during the cohydrolysis if desired, and are preferred if a low ratio of R" to Si is present.

The monomers corresponding to the $$H_sR''_tSiO_{\frac{4-s-t}{2}}$$

polymeric units (2B) are the well-known halosilanes such as $H_sR''_tSiCl_{4-s-t}$ and their alkoxy substituted derivatives. R" can be any monovalent hydrocarbon radical or any halogenated monovalent hydrocarbon radical. Suitable examples of R" radicals thus include all of the radicals listed above as illustrative of the R radicals, and the halogenated derivatives of such radicals, e.g. bromophenyl, dichlorophenyl, chloroxenyl, tetrabromoxenyl, tetrafluoroethyl, α,α,α-trifluorotolyl, chlorovinyl and 1,1,1-trifluoropropyl radicals. The preferred R" radicals are methyl, ethyl, phenyl, vinyl and halophenyl radicals. Particularly preferred species of the units in question are those of the formula $$Me_aPh_bVi_cH_sSiO_{\frac{4-a-b-c-s}{2}}$$

where a is an integer of from 0 to 3 inclusive, b is an integer of from 0 to 2 inclusive, c and s are integers of from 0 to 1 inclusive, the sum of $a+b+c+s$ being from 1 to 3 inclusive, and Me, Ph and Vi represent methyl, phenyl and vinyl radicals respectively.

In the various copolymers within the scope of this invention, it is preferred that there be no more than 99 molar percent of the (2B) units present. Thus in a copolymer of (2A) units with (2B) units, or of (1) units with (2B) units, it is preferred that there be at least one molar percent of the (2A) or (1) units present respectively.

Those polymers and copolymers of this invention which are liquid in nature exhibit improved lubricating properties as compared to conventional organosiloxane fluids, and hence are useful as lubricating oils and hydraulic fluids, and as additives to conventional organosiloxane fluids to improve their lubricating properties. Those products which are resinous in nature retain the thermal stability and other properties for which conventional organosiloxane resins have become well known, and hence the former are useful as impregnating and insulating varnishes, molding compounds, water repellents, and the like, typical of the conventional organosiloxane resins.

Those products of this invention which contain butyl groups attached to tin exhibit anti-microbic properties in respect to gram positive organisms such as *Micrococcus pyogenes* var. *aureus*, as well as antifungal and antimildew properties against such test organisms as *Fusarium oxysporum* (representative of the etiologic agents of "athlete's foot"), and *Aspergillus flavus* and *Penicillum sp.*, both representative of mildew producing organisms. These products can be used to treat materials such as textiles and leather to provide mildew resistance. Copolymers of the butyl substituted tin siloxane units with MeHSiO units can be used to impart both water repellency and mildew resistance to textiles.

The following examples are illustrative only and should not be construed as limiting the invention which is properly delineated in the appended claims. The symbols Me, Et, Bu, Ph, and Vi are used to represent methyl, ethyl, butyl, phenyl, and vinyl radicals respectively.

*Example 1*

A mixture of 22.6 grams (0.077 mol) of $$(Me_2MSiCH_2)_2SnMe_2$$

70 ml. ethanol, 4 grams water, and 0.2 gram KOH was heated at reflux. The evolution of the theoretical volume of hydrogen was accomplished in four hours, and the reaction product was diluted with benzene, washed, and distilled to provide the cyclic compound

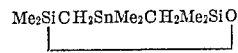

B.P. 95° C. at 21 mm. Hg, $n_D^{25}$ 1.4743, $d_4^{25}$ 1.203.

*Example 2*

A mixture of 18 grams (0.0386 mol) of $$(Me_2EtOSiCH_2)_2SnBu_2$$

70 ml. ethanol, 5 grams water, and 0.2 gram KOH was refluxed for 2 hours, then diluted with 60 ml. benzene, washed with water, dried over anhydrous sodium sulfate, and distilled to provide the cyclic compound

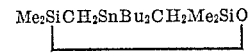

B.P. 170° C. at 25 mm. Hg, $n_D^{25}$ 1.4805, $d_4^{25}$ 1.116.

*Example 3*

A mixture of 20.5 grams (0.0574 mol) of $$[Me_2HSi(CH_2)_3]_2SnMe_2$$

70 ml. ethanol, 5 grams water, and 0.2 gram KOH was heated at reflux until the theoretical volume of hydrogen had been evolved. The reaction mass was diluted with 80 ml. benzene, washed with water, and dried over anhydrous sodium sulfate. The solvents were removed by flash distillation at atmospheric pressure, then 0.2 gram of powdered KOH was added to the residue and the mixture was thermally cracked at ultimate vacuum to a pot temperature of 250° C. Fractional distillation of the cracked product yielded the cyclic $$\overline{Me_2Si(CH_2)_3SnMe_2(CH_2)_3Me_2SiO}$$

B.P. 148° C. at 16 mm. Hg, $n_D^{25}$ 1.4840, $d_4^{25}$ 1.157. When [Me$_2$HSi(CH$_2$)$_3$]$_2$SnBu$_2$ is hydrolyzed and the hydrolyzate cracked by the above method, the cyclic $$\overline{Me_2Si(CH_2)_3SnBu_2(CH_2)_3Me_2SiO}$$

is produced. In like manner, from (PhMeHSiCH$_2$)SnPhMe there is produced the cyclic $$\overline{PhMeSiCH_2SnPhMeCH_2PhMeSiO}$$

and from (Me$_2$HSiCH$_2$CHMeCH$_2$)$_2$SnMe$_2$ is produced $$\overline{Me_2SiCH_2CHMeCH_2SnMe_2CH_2CHMeCH_2Me_2SiO}$$

Example 4

A mixture of 40 grams (0.11 mol) of

Bu$_3$SnCH$_2$SiMe$_2$H 100 ml. ethanol, 5.7 grams water, and 0.2 gram KOH was heated at reflux for 3 hours. Benzene was added to the reaction mixture and the ethanol and excess water were removed as the ternary azeotrope. The remainder of the solvent was stripped off and the product was fractionated to provide the disiloxane O[SiMe$_2$CH$_2$SnBu$_3$]$_2$, B.P. 240° C. at less than 0.1 mm. Hg, $n_D^{25}$ 1.4852, $d_4^{25}$ 1.102. In like manner, by hydrolyzing Me$_3$Sn(CH$_2$)$_3$SiMe$_2$H Me$_3$SnCH$_2$CHMeCH$_2$SiMe$_2$H, or Me$_2$PhSnCH$_2$SiMePhH, there is produced respectively the disiloxane O[SiMe$_2$(CH$_2$)$_3$SnMe$_3$]$_2$ O(SiMe$_2$CH$_2$CHMeCH$_2$SnMe$_3$)$_2$ or O(SiPhMeCH$_2$SnMe$_2$Ph)$_2$ By cohydrolyzing a mixture of Bu$_3$SnCH$_2$SiMe$_2$H and Me$_3$SnCH$_2$SiMe$_2$H, there is produced the disiloxane Bu$_3$SnCH$_2$Me$_2$SiOSiMe$_2$CH$_2$SnMe$_3$ along with O(SiMe$_2$CH$_2$SnBu$_3$)$_2$ and O(SiMe$_2$CH$_2$SnMe$_3$)$_2$

Example 5

When a mixture containing 0.45 mol of Me$_2$SiO units in the form of the cyclic (Me$_2$SiO)$_4$, 0.45 mol of the cyclic $$\overline{Me_2SiCH_2SnMe_2CH_2Me_2SiO}$$

and 0.05 mol of O(SiMe$_3$)$_2$ is heated to 140–150° C. for 3 hours in the presence of sufficient powdered KOH to provide 1 K atom per Si atom, a liquid linear copolymer is produced containing Me$_2$SiO, Me$_2$SiCH$_2$SnMe$_2$CH$_2$Me$_2$SiO— and Me$_3$SiO$_{.5}$ units in the average molar ratio of 45:45:10. Replacing the above silalkyltin cyclosiloxane with $$\overline{Me_2SiCH_2SnBu_2CH_2Me_2SiO} \text{ or } \overline{Me_2Si(CH_2)_3SnMe_2(CH_2)_3Me_2SiO}$$

in an otherwise identical process provides the corresponding copolymers containing Me$_2$SiCH$_2$SnBu$_2$CH$_2$Me$_2$SiO— or

Me$_2$Si(CH$_2$)$_3$SnMe$_2$(CH$_2$)$_3$Me$_2$SiO— units respectively. In like manner, by using the cyclic (PhMeSiO)$_4$ in place of the (Me$_2$SiO)$_4$, there is produced the corresponding copolymer containing PhMeSiO units.

Example 6

When an equimolar mixture of O(SiMe$_3$)$_2$ and

O(SiMe$_2$CH$_2$SnBu$_3$)$_2$ is heated in the presence of KOH as in Example 5, there is produced the disiloxane Me$_3$SiOSiMe$_2$CH$_2$SnBu$_3$. Likewise, by using a mixture of O(SiPhMeVi)$_2$ and O(SiPhMeCH$_2$SnMe$_2$Ph)$_2$ there is produced PhMeViSiOSiPhMeCH$_2$SnMe$_2$Ph

Example 7

When a mixture of (Me$_2$EtOSiCH$_2$)$_2$SnBu$_2$, MeHSiCl$_2$, and Me$_3$SiCl in the molar ratio of 1:8:1 is added to an excess of water, then the reaction mass heated at reflux and washed and dried, a copolymer is produced containing approximately 80 mol percent MeHSiO units, 10 mol percent Me$_3$SiO$_{.5}$ units, and 10 mol percent Me$_2$SiCH$_2$SnBu$_2$CH$_2$Me$_2$SiO— units.

Likewise, by mixing MeSiCl$_3$, PhSiCl$_3$,

Br$_2$C$_6$H$_3$MeSiCl$_2$

F$_3$CCH$_2$CH$_2$Si(OEt)$_3$, and (Me$_2$EtOSiCH$_2$)$_2$SnBu$_2$ in equimolar portions, adding an equal weight of toluene, cohydrolyzing the mixture with an excess of water, and treating the cohydrolyzate as above, there is produced a toluene solution of a resinous copolymer containing MeSiO$_{1.5}$, PhSiO$_{1.5}$, Br$_2$C$_6$H$_3$MeSiO, F$_3$CCH$_2$CH$_2$SiO$_{1.5}$, and Me$_2$SiCH$_2$SnBu$_2$CH$_2$Me$_2$SiO— units.

Example 8

When a mixture of O(SiMe$_2$CH$_2$SnBu$_3$)$_2$ and $$\overline{Me_2SiCH_2SnMe_2CH_2Me_2SiO}$$

in the molar ratio of 1:4 is heated with powdered KOH as in Example 5, a linear copolymer is produced containing Bu$_3$SnCH$_2$Me$_2$SiO$_{.5}$ and Me$_2$SiCH$_2$SnMe$_2$CH$_2$Me$_2$SiO— units.

That which is claimed is:

1. A silalkyltin siloxane selected from the group consisting of (1) cyclic disiloxanes of the formula $$\overline{R_2Si[CH_2(CHZ)_n(CH_2)_m]SnR'_2[(CH_2)_m(CHZ)_nCH_2]R_2SiO}$$

and (2) linear disiloxanes of the formula

O[SiR$_2$CH$_2$(CHZ)$_n$(CH$_2$)$_m$SnR'$_3$]$_2$ in which formulas each R is a monovalent hydrocarbon radical, each R' is selected from the group consisting of alkyl and phenyl radicals, Z is selected from the group consisting of hydrogen and the methyl radical, $m$ is an integer of from 0 to 1 inclusive, and $n$ is an integer of from 0 to 1 inclusive and is 1 only when $m$ is 1.

2. A cyclic silalkyltin siloxane having the formula $$\overline{R_2Si[CH_2(CHZ)_n(CH_2)_m]SnR'_2[(CH_2)_m(CHZ)_nCH_2]R_2SiO}$$

where each R is a monovalent hydrocarbon radical, each R' is selected from the group consisting of alkyl and phenyl radicals, Z is selected from the group consisting of hydrogen and the methyl radical, $m$ is an integer of from 0 to 1 inclusive, and $n$ is an integer of from 0 to 1 inclusive and is 1 only when $m$ is 1.

3. A cyclic silalkyltin siloxane having the formula

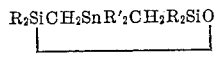
$$R_2SiCH_2SnR'_2CH_2R_2SiO$$

where each R is a monovalent hydrocarbon radical and each R' is selected from the group consisting of alkyl and phenyl radicals.

4. A cyclic silalkyltin siloxane of the formula

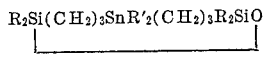
$$R_2Si(CH_2)_3SnR'_2(CH_2)_3R_2SiO$$

where each R is a monovalent hydrocarbon radical and each R' is selected from the group consisting of alkyl and phenyl radicals.

5. A cyclic silalkyltin siloxane of the formula

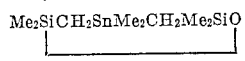
$$Me_2SiCH_2SnMe_2CH_2Me_2SiO$$

where Me represents a methyl radical.

6. A cyclic silalkyltin siloxane of the formula

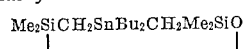
$$Me_2SiCH_2SnBu_2CH_2Me_2SiO$$

where Me and Bu represent methyl and butyl radicals respectively.

7. A cyclic silalkyltin siloxane of the formula

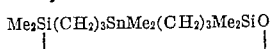
$$Me_2Si(CH_2)_3SnMe_2(CH_2)_3Me_2SiO$$

where Me represents a methyl radical.

8. A cyclic silalkyltin siloxane of the formula

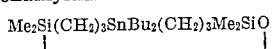
$$Me_2Si(CH_2)_3SnBu_2(CH_2)_3Me_2SiO$$

where Me and Bu represent methyl and butyl radicals respectively.

9. A copolymeric silalkyltin siloxane in which the polymeric units consist essentially of (1) units of the formula

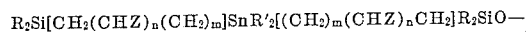
$$R_2Si[CH_2(CHZ)_n(CH_2)_m]SnR'_2[(CH_2)_m(CHZ)_nCH_2]R_2SiO-$$

and (2) units selected from the group consisting of (A) units of the formula $R'_3SnCH_2(CHZ)_n(CH_2)_mR_2SiO_{.5}$ and (B) units of the formula

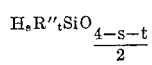
$$H_sR''_tSiO_{\frac{4-s-t}{2}}$$

in which formulas each R is a monovalent hydrocarbon radical, each R' is selected from the group consisting of alkyl and phenyl radicals, Z is selected from the group consisting of hydrogen and the methyl radical, $m$ is an integer of from 0 to 1 inclusive and $n$ is an integer of from 0 to 1 inclusive and is 1 only when $m$ is 1, each R'' is selected from the group consisting of monovalent hydrocarbon radicals and halogenated monovalent hydrocarbon radicals, $t$ is an integer of from 1 to 3 inclusive, $s$ is from 0 to 1 inclusive and $s+t$ is from 1 to 3 inclusive.

10. A silalkyltin disiloxane of the formula

$$O[SiR_2CH_2SnR'_3]_2$$

where each R is a monovalent hydrocarbon radical and each R' is selected from the group consisting of alkyl and phenyl radicals.

11. A silalkyltin disiloxane of the formula

$$O[SiR_2(CH_2)_3SnR'_3]_2$$

where each R is a monovalent hydrocarbon radical and each R' is selected from the group consisting of alkyl and phenyl radicals.

12. A silalkyltin disiloxane of the formula

$$O[SiMe_2CH_2SnBu_3]_2$$

where Me and Bu represent methyl and butyl radicals respectively.

13. A copolymeric silalkyltin siloxane in which the units consist essentially of (1) units of the formula $R'_3Sn(CH_2)_m(CHZ)_nCH_2R_2SiO_{.5}$ where each R is a monovalent hydrocarbon radical, each R' is selected from the group consisting of alkyl and phenyl radicals, Z is selected from the group consisting of hydrogen and the methyl radical, $m$ is an integer of from 0 to 1 inclusive and $n$ is an integer of from 0 to 1 inclusive and is 1 only when $m$ is 1, and (2) units of the formula

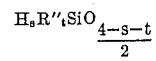
$$H_sR''_tSiO_{\frac{4-s-t}{2}}$$

where each R'' is selected from the group consisting of monovalent hydrocarbon and halogenated monovalent hydrocarbon radicals, $t$ is an integer of from 1 to 3 inclusive, $s$ is from 0 to 1 inclusive, and $s+t$ is from 1 to 3 inclusive, there being at least 1 molar percent of the (1) units present in the copolymer.

14. A copolymeric silalkyltin silozane in which the units consist essentially of (1) units of the formula $R'_3SnCH_2R_2SiO_{.5}$ where each R is a monovalent hydrocarbon radical and each R' is selected from the group consisting of alkyl and phenyl radicals, and (2) units of the formula

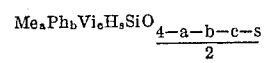
$$Me_aPh_bVi_cH_sSiO_{\frac{4-a-b-c-s}{2}}$$

where $a$ is an integer of from 0 to 3 inclusive, $b$ is an integer of from 0 to 2 inclusive, $c$ and $s$ are integers of from 0 to 1 inclusive, the sum of $a+b+c+s$ being from 1 to 3 inclusive, and Me, Ph and Vi represent methyl, phenyl and vinyl radicals respectively, there being at least 1 molar percent of the (1) units present in the copolymer.

References Cited in the file of this patent

Seyferth et al.: J. Org. Chem., vol. 20, pp. 250–256 (1956).

Chem. Abstr., vol. 52, p. 1087 (1958), abstract of article by Papetti et al., J. Organic Chem. 22, pp. 526–528. (1957).